United States Patent
Sutton et al.

(10) Patent No.: US 9,334,374 B2
(45) Date of Patent: May 10, 2016

(54) POLYPROPYLENE BLENDS AND PROCESSES FOR PRODUCING POLYMERIC COMPOSITIONS

(71) Applicants: Dow Global Technologies LLC, Midland, MI (US); UNIVERSITY OF SOUTHAMPTON, Highland, Southampton (GB); GNOSYS UK LIMITED, Guildford, Surrey (GB)

(72) Inventors: Simon Sutton, Egham (GB); Theo E. Geussens, Samstagern (CH); Alun Vaughan, Winchester (GB); Gary Stevens, Surrey (GB)

(73) Assignees: Dow Global Technologies LLC, Midland, MI (US); Dow Chemical Company Limited, Staines, Middlesex (GB); University of Southhampton, Southampton (GB); GnoSys Global Ltd., Surrey (GB)

( * ) Notice: Subject to any disclaimer, the term of this patent is extended or adjusted under 35 U.S.C. 154(b) by 0 days.

(21) Appl. No.: 14/387,141

(22) PCT Filed: Feb. 22, 2013

(86) PCT No.: PCT/US2013/027255
§ 371 (c)(1),
(2) Date: Sep. 22, 2014

(87) PCT Pub. No.: WO2013/148028
PCT Pub. Date: Oct. 3, 2013

(65) Prior Publication Data
US 2015/0087787 A1  Mar. 26, 2015

Related U.S. Application Data

(60) Provisional application No. 61/617,347, filed on Mar. 29, 2012.

(51) Int. Cl.
| | | |
|---|---|---|
| *B29C 47/88* | (2006.01) | |
| *C08J 3/00* | (2006.01) | |
| *C08L 23/12* | (2006.01) | |
| *H01B 3/44* | (2006.01) | |
| *B05D 1/00* | (2006.01) | |

(52) U.S. Cl.
CPC ... *C08J 3/00* (2013.01); *B05D 1/00* (2013.01); *C08J 3/005* (2013.01); *C08L 23/12* (2013.01); *H01B 3/441* (2013.01); *B29C 47/8815* (2013.01); *C08J 2323/12* (2013.01); *C08J 2323/16* (2013.01); *C08L 2205/02* (2013.01)

(58) Field of Classification Search
CPC ......... C08L 23/02; C08L 23/10; C08L 23/12; C08L 23/142; C08L 2205/02; C08J 2323/12; C08J 2323/16; C08J 3/00; C08J 3/005; H01B 3/441; B05D 1/00; B29C 47/8815
See application file for complete search history.

(56) References Cited

U.S. PATENT DOCUMENTS

| | | | | |
|---|---|---|---|---|
| 6,153,703 A | * | 11/2000 | Lustiger et al. | 525/240 |
| 2002/0032283 A1 | * | 3/2002 | Kanamori et al. | 525/240 |
| 2009/0156700 A1 | * | 6/2009 | Oikawa et al. | 521/56 |
| 2010/0152360 A1 | * | 6/2010 | Jiang et al. | 524/515 |

OTHER PUBLICATIONS

Coccorullo, I. et al. Journal of Applied Polymer Science vol. 82 pp. 2237-2244 published online Sep. 2001.*

* cited by examiner

*Primary Examiner* — Irina S Zemel
*Assistant Examiner* — Jeffrey Lenihan

(57) ABSTRACT

Polymer blends of polypropylene homopolymer and propylene-α-olefin interpolymer. Processes for producing polymeric compositions comprising control-cooling heated blends of polypropylene and propylene-α-olefin interpolymer. Such polymeric compositions can be employed in forming coated wires and cables.

10 Claims, 3 Drawing Sheets

POLYPROPYLENE BLENDS AND PROCESSES FOR PRODUCING POLYMERIC COMPOSITIONS

REFERENCE TO RELATED APPLICATIONS

The present application claims the benefit of U.S. Provisional Application No. 61/617,347, filed on Mar. 29, 2012.

FIELD

Various embodiments of the present invention relate to polymer blends of polypropylene homopolymer and propylene-α-olefin interpolymer. Other aspects of the invention concern control-cooling polymer melt blends of polypropylene and propylene-α-olefin interpolymer to form polymeric compositions.

INTRODUCTION

Public scrutiny of crosslinked insulating layer in wire and cable continues to heighten as social consciousness drives the development of ever-more sustainable materials. One favorable sustainability criteria is recyclability. It is well known that crosslinked materials are not readily recyclable, and, at the end of their life, crosslinked materials are generally disposed of by incineration or landfill.

In the search for sustainable substitutes for crosslinked insulating layers with adequate electrical breakdown strength for wire and cable applications, it is known that breakdown strength in a polymeric insulation layer is influenced by the polymer morphology. For example, isothermal crystallization of blends of branched polyolefin and linear polyolefin is known to improve the electrical breakdown strength and treeing resistance in polyolefin blends compared to the branched homopolymer for appropriate crystallization conditions.

Isothermal crystallization, however, has shortcomings Isothermal crystallization requires the target polymer to be held at a constant crystallization temperature for an extended period (sometimes on the order of hours) in order to ensure complete crystallization. For this reason, isothermal crystallization is impractical for many commercial applications.

Accordingly, the art recognizes the need for a substitute to crosslinked insulating materials for wire and cable applications. Thus, a need exists for a thermoplastic insulating layer with sufficient dielectric strength and a process for producing same on a commercial scale.

SUMMARY

One embodiment is a process for preparing a thermoplastic polymeric composition, said process comprising:
(a) heating a polymer blend comprising a polypropylene homopolymer and a propylene-α-olefin interpolymer to a melt temperature of greater than 140° C. and at least the melting temperature of either the polypropylene homopolymer or the propylene-α-olefin interpolymer, whichever is greater, for a time sufficient to form a polymer melt blend; and
(b) cooling said polymer melt blend from said melt temperature down to ambient temperature, wherein said cooling comprises:
 (i) non-control-cooling said polymer melt blend from said melt temperature to an initial cooled temperature in the range of from 140 to 125° C.,
 (ii) control-cooling said polymer melt blend at an average cooling rate in the range of from 0.1 to 30° C. per minute from said initial cooled temperature to an intermediate cooled temperature in the range of from 110 to 100° C., and
 (iii) cooling, by either control-cooling or non-control-cooling, said polymer melt blend from said intermediate cooled temperature to ambient temperature, thereby forming said polymeric composition.

DETAILED DESCRIPTION

Figure 1A:
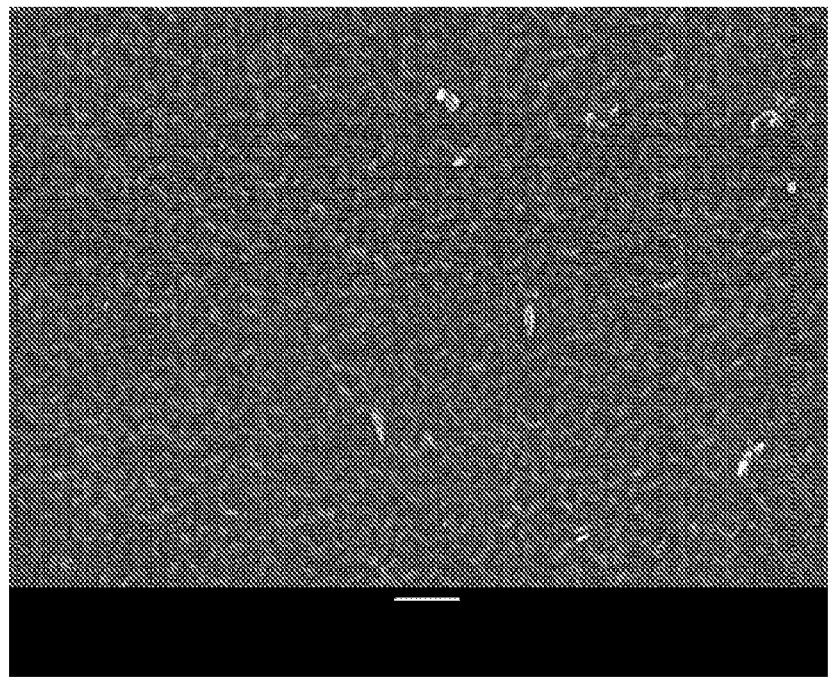
FIGS. 1a, 1b are Scanning Electron Microscope ("SEM") micrographs from different locations within a cable having at least one layer of a polymeric composition prepared as described above showing the morphology seen in transverse section (etched surfaces)

The present disclosure provides a process for preparing a polymeric composition. The process includes heating a polymer blend comprising a polypropylene homopolymer and a propylene-α-olefin interpolymer to form a polymer melt blend. The process further includes control-cooling the polymer melt blend at a rate ranging from 0.1 to 30 degrees Celsius per minute ("° C./min").

Polymeric Composition

The polypropylene homopolymer can be any polypropylene homopolymer known in the art. As used herein, the term "homopolymer" denotes a polymer comprising repeating units derived from a single monomer type, but does not exclude residual amounts of other components used in preparing the homopolymer, such as chain transfer agents. The polypropylene homopolymer may be a Ziegler-Natta catalyzed polymer, a metallocene-catalyzed polymer, or a constrained geometry catalyst catalyzed polymer, and may be made using gas phase, solution, or slurry polymer manufacturing processes.

The polypropylene homopolymer can be primarily isotactic or primarily syndiotactic. As used herein with respect to the polypropylene homopolymer, the term "primarily" means greater than 60 percent. For example, a primarily syndiotactic polypropylene homopolymer can have greater than 60 percent racemo diads. In an embodiment, the polypropylene homopolymer is primarily isotactic. In various embodiments, the polypropylene homopolymer can have at least 70, at least 80, at least 90, or at least 95 percent isotactic pentads as determined by $^{13}$C-nulcear magnetic resonance ("NMR") analysis.

In various embodiments, the polypropylene homopolymer is non-nucleated.

In an embodiment, the polypropylene homopolymer can have a melt index ("$I_2$") from 0.5 to 10 g/10 minutes ("min"), or from 1 to 5 g/10 min, as determined according to ASTM D-1238 (230° C./2.16 kg). Also, the polypropylene homopolymer can have a polydispersity index ("PDI") (i.e., weight average molecular weight/number average molecular weight; "Mw/Mn;" or molecular weight distribution ("MWD")) in the range of from 2 to 12, or from 3 to 8, as determined by gel permeation chromatography.

Exemplary commercially available polypropylene homopolymers include BRASKEM™ PP H358-2, available from Braskem S. A. (São Paulo, Brazil); MOPLEN™ HP1073, available from LyondellBasell (Rotterdam, Netherlands); or PP525 P available from Sabic (Riyadh, Saudi Arabia).

The propylene-α-olefin interpolymer is propylene monomer copolymerized with one or more types of α-olefin comonomer. The propylene-α-olefin interpolymer may be a Ziegler-Natta catalyzed polymer, a metallocene-catalyzed polymer, or a constrained geometry catalyst catalyzed polymer, and may be made using gas phase, solution, or slurry polymer manufacturing processes.

The α-olefin comonomer can be ethylene, a $C_{4-20}$ (i.e., a monomer having 4 to 20 carbon atoms) linear, branched or cyclic α-olefin, or mixtures of two or more thereof. Non-limiting examples of suitable $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative propylene-α-olefin interpolymers include propylene/ethylene, propylene/butene, propylene/1-hexene, propylene/1-octene, ethylene/propylene/1-octene, ethylene/propylene/butene, and ethylene/propylene/diene monomer ("EPDM"). The propylene-α-olefin interpolymers can be random interpolymers. In an embodiment, the α-olefin component of the propylene-α-olefin interpolymer is ethylene.

The polymerized α-olefin component of the propylene-α-olefin interpolymer can constitute from greater than 0 to up to 15 mole percent ("mol %"), or from 5 to 15 mol %, of the total propylene-α-olefin interpolymer. Polymerized propylene can constitute all or substantially all of the remainder of the propylene-α-olefin interpolymer.

In an embodiment, the propylene-α-olefin interpolymer has a density from 0.855 to 0.90 g/cm³, or from 0.86 to 0.88 g/cm³, as determined according to ASTM D-792. The propylene-α-olefin interpolymer can have a melt index ("$I_2$") from 1 to 10 g/10 min, or from 1 to 5 g/10 min, as determined according to ASTM D-1238 (230° C./2.16 kg). Also, the propylene-α-olefin interpolymer/can have a PDI in the range of from 2 to 6, or in the range of from 2 to 4, as determined by gel permeation chromatography.

Exemplary commercially available propylene-α-olefin interpolymers include VERSIFY™ 2200 and 2400, each available from The Dow Chemical Company (Midland, Mich., USA); VISTAMAXX™ 3020 FL from ExxonMobil Chemical (Irving, Tex., USA); or TAFMER™ XM from Mitsui Chemicals (Tokyo, Japan).

The polypropylene homopolymer and the propylene-α-olefin interpolymer are combined together to form a polymer blend. In one embodiment, the polypropylene homopolymer and the propylene-α-olefin interpolymer can be melt blended to form the polymer blend. Additionally, a dry blend of the polypropylene homopolymer and the propylene-α-olefin interpolymer can be compounded (via melt extrusion for example) and formed into any desired shape (film, pellet, cable insulation, etc.). The polymer blend may then be melt-shaped into an article as will be further discussed below. In an embodiment, the polypropylene homopolymer and the propylene-α-olefin interpolymer can be fed into a cable insulation extruder and formed into an extrudate.

In various embodiments, the polypropylene homopolymer and the propylene-α-olefin interpolymer can be present in the polymer blend in a weight ratio ranging from 4:1 to 1:4, 3:1 to 1:3, 1:2 to 2:1, or 1:1, based on the combined weight of the polypropylene homopolymer and the propylene-α-olefin interpolymer. Particularly, the polypropylene homopolymer can constitute in the range of from 35 to 65 weight percent ("wt %"), or 50 wt % of the polymer blend based on the combined weight of the polypropylene homopolymer and the propylene-α-olefin interpolymer. Similarly, the propylene-α-olefin interpolymer can constitute in the range of from 35 to 65 wt %, or 50 wt % of the polymer blend based on the combined weight of the polypropylene homopolymer and the propylene-α-olefin interpolymer.

The polymer blend can be heated to a melting temperature of at least the melting point of either the polypropylene homopolymer or the propylene-α-olefin interpolymer, whichever is greater. In other words, the polymer blend is heated to ensure that both the polypropylene homopolymer and the propylene-α-olefin interpolymer are in a molten state to form a polymer melt blend. In certain embodiments, the polypropylene homopolymer will have the higher melting point, which can be about 160° C. Accordingly, the polymer blend can be heated to a temperature greater than 160° C. In various embodiments, the polymer blend can be heated to a temperature of at least 170° C., at least 180° C., at least 190° C., or at least 200° C., up to a maximum temperature of 240° C., 260° C., 280° C., or 300° C.

It should be understood that, although the blending and heating steps discussed above have been described as sequential, these steps can overlap and even be performed simultaneously. Additionally, the heating and blending steps may be performed in reverse order (i.e., heating followed by blending of the polypropylene homopolymer and the propylene-α-olefin interpolymer).

The process includes control-cooling the resulting polymer melt blend. As used herein, the term "control-cooling," "control-cool," "control-cooled," and like terms is a procedure that applies an external cooling regime which results in lowering the temperature of the heated polymer blend at a determined rate. Control-cooling of the heated polymer blend yields non-isothermal crystallization of the polypropylene homopolymer, the propylene-α-olefin interpolymer, or both. Thus a "control-cooled polymeric composition" is a composition that has been subjected to a control-cooling procedure. In an embodiment, the control-cool cooling rate can range from 0.1° C./min, 0.2° C./min, 0.5° C./min, or 1° C./min, up to 30° C./min, 20° C./min, 15° C./min, or 10° C./min.

Control-cooling is distinct from non-control-cooling. The term "non-control-cooling" denotes a lowering in temperature in an uncontrolled manner.

Control-cooling excludes isothermal crystallization. The term "isothermal crystallization" is crystallization of a polymer at a constant temperature, typically the crystallization temperature of the polymer. In other words, the polymer melt temperature does not change during isothermal crystallization of the polymer. Control-cooling also excludes quenching. The term "quench," or "quenching," is rapid cooling of the material by, but not limited to, the (whole or partial) immersion of a heated material into a liquid bath (typically water).

In an embodiment, the control-cool includes exposing the polymer melt blend to ambient air, exposing the polymer melt blend to cooled or chilled fluid (such as liquid, air, nitrogen, oxygen, or combinations thereof), passing the polymer melt blend through a controlled-temperature chamber (such as a tube, pipe or conduit or bath), and any combination thereof.

In an embodiment, following control-cooling, the resulting polymeric composition can have an alternating current ("AC") breakdown strength of at least 100 kV/mm, at least 105 kV/mm, at least 110 kV/mm, at least 120 kV/mm, at least 130 kV/mm, or at least 140 kV/mm, as measured on 100 micrometer ("µm") thick films in accordance with ASTM D-149.

In an embodiment, the present process can increase the AC breakdown strength of films prepared with the above-described compositions. Compared to a non-control-cooled (e.g., quench-cooled) film having the identical composition as a control-cooled film composed of the present polymeric composition, the control-cooled film can have an AC breakdown strength at least 5%, at least 8%, at least 10%, at least 15%, at least 20%, at least 30%, or at least 40% greater than the non-control-cooled (e.g., quench-cooled) film, as measured on 100 µm thick films accordance with ASTM D-149.

The rate of the control-cool can be constant or variable. The temperature range to which the control-cool is applied may also be adjusted. For example, the polymer blend may be heated to a temperature of 200° C. The control-cool may be applied over the entire range from 200° C. to ambient, or within a portion of that range. For example, in an embodiment, control-cooling can be applied over a range from 140 to 100° C., or from 125 to 110° C. "Ambient," as used herein, denotes the environmental temperature surrounding the production equipment used in preparing the polymeric composition. Ambient temperature typically ranges from 20 to 30° C., from 20 to 25° C., or 22° C.

In one embodiment, the polymer melt blend is cooled from the melt temperature down to ambient temperature by: (i) non-control-cooling the polymer melt blend from the melt temperature to an initial cooled temperature in the range of from 140 to 125° C., (ii) control-cooling the polymer melt blend at an average cooling rate in the range of from 0.1 to 30° C. per minute from the initial cooled temperature to an intermediate cooled temperature in the range of from 110 to 100° C., and (iii) cooling, by either control-cooling or non-control-cooling, the polymer melt blend from the intermediate cooled temperature to ambient temperature. In an embodiment, step (iii) of this cooling procedure is performed by non-control-cooling.

In an embodiment, the control-cool window is from 140° C., 130° C., or 125° C., down to 110° C., 100° C., or 90° C. In this embodiment, the polymeric composition is heated to at least the melting temperature of the polypropylene homopolymer or propylene-α-olefin interpolymer, whichever is greater, typically at least 160° C. When the temperature of the heated polymer blend is cooled (not control-cooled) to the upper boundary (140° C., 130° C., or 125° C.) for the control-cool window, the control-cool is initiated and is applied to the heated polymer blend. The control-cool is applied until the heated polymer blend reaches the lower boundary of the control-cool window (105° C., 100° C., 95° C., 90° C.). Once the temperature of the heated polymer blend is below this lower boundary, the control-cool protocol is suspended and the heated polymer blend is non-control-cooled and/or quenched.

In another non-limiting example, the polymer blend may be heated to above 160° C. The polymer blend is cooled from the melt temperature to 125° C. The control-cool may then be initiated and may be applied to a cooling range of 125 to 90° C. The control-cool may be varied across this control-cool window. The control-cool may have a cooling rate of 3° C./min until 120° C. is reached. Once at 120° C., the control-cool may be varied to 0.2° C./min until 105° C. is reached. At 105° C., the control-cool may be varied to 7° C./min until 90° C. is reached. In view of these non-limiting examples, it is understood that the cooling rate during the control-cool may be constant or may be varied.

Coated Conductor

The improved breakdown strength of the present polymeric composition makes it well suited for wire and cable coating applications and wire/cable insulating layers in particular. Accordingly, the present disclosure provides a process to produce a coated conductor. A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

The conductor may be a single cable or a plurality of cables bound together (i.e., a cable core, or a core). A "cable" is at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered, or insulated. Combination cables may contain both electrical wires and optical fibers.

The process for producing a coated conductor includes heating a polymer blend composed of a polypropylene homopolymer and a propylene-α-olefin interpolymer to at least the melting temperature the polypropylene homopolymer or the propylene-α-olefin interpolymer, whichever is higher, and extruding the polymer melt blend onto the conductor. The term "onto" includes direct contact or indirect contact between the polymer melt blend and the conductor. It is understood that the polymer melt blend is in an extrudable state. The process further includes control-cooling the polymer melt blend located on the conductor over a portion of the cooling temperature range under conditions described above, and forming a coating of the polymeric composition on the conductor.

In an embodiment, the control-cool includes exposing the conductor with a melt-blended coating thereon to a cooling medium (e.g., a fluid), such as ambient air or a thermally-controlled liquid, exposing the conductor with melt-blended coating thereon to a cooled or a chilled fluid (such as air, nitrogen, oxygen, liquid or combinations thereof), passing the conductor with melt-blended coating thereon through a controlled-temperature chamber (such as a tube, pipe, conduit or bath), leading the conductor with the melt-blended coating thereon through a pipe with a controlled temperature, and any combination thereof.

In an embodiment, the process includes forming the polymeric composition into an insulating layer, the insulating layer having a direct current ("DC") breakdown voltage greater than 400 kV at ambient conditions as measured on a cable where the insulating layer has a thickness of 3.5 mm.

In an embodiment, the process includes forming a crosslink-free coating on the conductor. Accordingly, in various embodiments, the above-described polymeric composition is cross-link free or substantially cross-link free. In an embodiment, the polymeric composition is a thermoplastic composition.

The coating is located on the conductor. The coating may be one or more inner layers such as an insulating layer and/or a semiconducting layer. The coating may also include an outer layer (also referred to as a "jacket" or a "sheath"). The coating may wholly or partially cover or otherwise surround or encase the conductor. The coating may be the sole component surrounding the conductor. Alternatively, the coating may be one layer of a multilayer jacket or sheath encasing the metal conductor.

The coated conductor prepared by the foregoing process may be flexible, semi-rigid, or rigid. Non-limiting examples of suitable coated conductors include flexible wiring such as wiring for consumer electronics, a power cable, a power charger wire for cell phones and/or computers, computer data cords, power cords, appliance wiring material, and consumer electronic accessory cords.

Additives

Any of the foregoing polymeric compositions and/or coatings may optionally contain one or more additives. Non-limiting examples of suitable additives include antioxidants, stabilizers, lubricants, and/or processing aids. As antioxidant, sterically hindered or semi-hindered phenols, aromatic amines, aliphatic sterically hindered amines, organic phosphates, thio compounds, and mixtures thereof, are included. As further non-limiting additives, flame retardant additives, acid scavengers, inorganic fillers, water-tree retardants and other voltage stabilizers are included.

DEFINITIONS

The "breakdown strength" of an insulator is the minimum electrical stress that causes a portion of an insulator to become electrically conductive. AC breakdown strength for polymeric composition is determined in accordance with ASTM D-149. DC breakdown strength for an insulating layer of a coated conductor is determined at ambient conditions according to the procedure described in Example 5, below.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

EXAMPLES

Example 1

Effect of Control-Cooling Rate and Polymer Ratio on Breakdown Strength

Prepare twelve polymer blends by melt blending in a Brabender Plastograph with W50EHT mixing attachment. Premix granular polypropylene homopolymer and propylene/ethylene interpolymer in the blend ratio indicated in Table 1, below. The polypropylene ("PP") homopolymer is Braskem PP H358-02, commercially available from Braskem S. A. (São Paulo, Brazil). The propylene/ethylene ("PE") interpolymer is either VERSIFY™ 2200 (density: 0.876 g/cm$^3$) or VERSIFY™ 2400 (density: 0.858 g/cm$^3$), as indicated in Table 1, below, each of which is commercially available from The Dow Chemical Company. Place 36 g of the premixed polymer into the mixing chamber preheated to 170° C. Mix at 30 rpm at a temperature of 170° C. on a 20-minute program. Cool the samples by the cooling regimes noted in Table 1.

Prepare film specimens (~100 µm in thickness) of the blended polymer using a Graseby-Specac 25.011 hydraulic press. Heat the mold to a stable temperature of 200° C. Insert approximately 0.13 g of polymer into the mold between aluminum foils and insert into the press; after 10 seconds, apply a pressure of 4 tons. Remove the sample and quench in a beaker of tap water.

Impart thermal histories to the samples using a Mettler Toledo FP82HT hotstage. Pre-heat the hotstage to 200° C., and hold the samples (still in their foils) at this temperature for 2 minutes ("min") Thereafter, the samples are either (1) quenched immediately; (2) removed from the hotstage and naturally cooled (i.e., allowed to cool in an uncontrolled manner) from 200 to 140° C., then control-cooled from 140 to 100° C. at 1° C./min, and thereafter naturally cooled to ambient; or (3) removed from the hotstage and control-cooled from 200 to 100° C. at 0.1° C./min, and thereafter naturally cooled to ambient.

Remove the foils by shaking the samples in ~4 wt % HCl in distilled water for 6 hours. Wash the samples thoroughly in distilled water and leave to dry overnight.

Determine alternating current ("AC") breakdown strength values for these samples according to ASTM D 149 by placing the samples between two vertically opposed 6.3 mm ball bearings in a tank of 20 centistoke ("cs") silicone fluid. Apply a 50 Hz ramp from zero until breakdown at a rate of 50±2 volts per second ("Vs$^{-1}$"). For each thermal history, subject 3 disks to 8 breakdown events each.

Process the resulting data using Weibull ++7 software from Reliasoft Corp. This provides maximum likelihood estimates of the Weibull scale and shape parameters together with 90% 2-tailed confidence intervals. Table 1 presents the derived data.

TABLE 1

Effect of Cooling Rate on Breakdown Strength

| Sample | Versify Grade/ Percentage in Blend (wt %) | Estimated Weibull Characteristic Breakdown Strength (kV/mm) | Cooling Regime |
|---|---|---|---|
| 1 | 2200/50 | 141.0 | Hold @ 200° C. for 2 min, cool from 200° C. to 140° C. on the hotstage (cooling rate ~40° C. min$^{-1}$), cool from 140° C. to 100° C. @ 1° C. min$^{-1}$, then cool naturally to ambient. |
| 2 | 2400/50 | 138.0 | |
| 3 | 2200/62.5 | 110.0 | |
| 4 | 2400/62.5 | 86.0 | |
| 5 | 2200/50 | 81.8 | Cool from 200° C. to 100° C. @ 0.1° C. min$^{-1}$ then cool naturally to ambient. |
| 6 | 2400/50 | 63.4 | |
| 7 | 2200/62.5 | 81.3 | |
| 8 | 2400/62.5 | 73.4 | |
| 9 | 2200/50 | 114.0 | Hold @ 200° C. for 2 min, then quench into tap water at 5-15° C. |
| 10 | 2400/50 | 113.0 | |
| 11 | 2200/62.5 | 102.0 | |
| 12 | 2400/62.5 | 67.0 | |

Samples 1-4 show that a controlled cooling rate of 1° C./min provides superior breakdown strength when applied over a range of from 140 to 100° C.

Example 2

Effect of Control-Cooling Rate on Breakdown Strength for 50/50 Blend

Compound a blend composing the following components on a Berstorff ZE40UT twin-screw extruder:
Polypropylene homopolymer (Braskem PP H358-02): 49.95%
Propylene-ethylene copolymer (VERSIFY™ 2200): 50%
Antioxidant (IRGANOX™ 1010): 0.05%

The extruder temperature profile used is:
Zone 1: cooled
Zone 2: 155° C.
Zone 3: 190° C.
Zone 4: 199° C.
Zone 5-8: 210° C.
T-valve: 220° C.
Die: 230° C.

The screw speed is 500 rpm and the output 150 kg/h. 400 kg of the blend are compounded.

Prepare 0.5 mm thick plaques with 48 g of the compound in a Collin Hot press. First, press the material at a pressure of 2 bar (0.2 megapascal ("MPa")) and 180° C. for 260 seconds ("s"); thereafter, increase the pressure to 200 bar (20 MPa) for 300 s, and then cool the samples at the cooling regimes shown in Table 2 to room temperature. For the quench-cooled sample, remove the plaque and support plates from the press while still hot and submerge in a water bath containing water at ambient temperature. Measure the AC breakdown strength in accordance with IEC 60243-1 employing 0.5 mm plaques, with the following parameters:

Device: PRF 50/A (Sefelec GmbH) up to 50 kV
Frequency: 50 Hz
Number of specimen: 10
Cylindrical Electrodes with diameter 25 mm/75 mm
Measurement fixture filled with oil
Measure-time between 10 and 20 sec.

The results are provided in Table 2, below.

TABLE 2

Effect of Cooling Rate on Breakdown Strength

| Sample | Estimated Weibull Characteristic Breakdown Strength (kV/mm) | Cooling Regime (° C./min) |
|---|---|---|
| 13 | 56.15 ± 1.1 | 0.3 |
| 14 | 55.83 ± 1.5 | 1.0 |
| 15 | 56.94 ± 1.6 | 10.0 |
| 16 | 55.57 ± 1.4 | 15.0 |
| 17 | 56.09 ± 1.9 | 20.0 |
| 18 | 54.47 ± 2.4 | 30.0 |
| 19 | 48.76 ± 1.6 | 70.0 |
| 20 | 50.37 ± 3.7 | Quench |

The results in Table 2, above, indicate a decrease in breakdown performance at cooling rates greater than 30° C./min.

Example 3

Preparation of Cable Specimen

Compound a polymeric blend as described above in Example 2. Extrude a cable with this composition as a coating. Prepare the cable as a 10 kV model cable (aluminium conductor size: 25 mm$^2$) on a line consisting of a 45 mm 20 L/D insulation extruder and two 30 mm 20 L/D extruders for the inner and outer semiconductive screens. The heating of the continuous vulcanization ("CV") tube is switched off; the cooling section is cooled with water having a temperature of about 15° C.).

Prepare the cable insulation from the above-described blend. Dow DHDA-7707 BK (thermoplastic semiconductive grade; available from The Dow Chemical Company) is used as the inner semiconductive layer (i.e., conductor screen). No insulation screen is applied to facilitate cable breakdown testing. Dry the semiconductive resin for 2 hours.

Set the temperature profile of the insulation extruder at 170/170/180/180/180° C.; set the inner semicon extruder temperature profile at 150/150/150/150° C. Set the head temperature at 185/185/185° C.

Insulation thickness is 3.5 mm; the inner semiconductive layer is 0.5 mm thick.

Operate the insulation extruder with a screw speed of 45 rpm; the melt temperature is 195° C. and the melt pressure 32 bar. Operate the semiconductive layer extruder at 10 rpm; the melt temperature is 182° C. and the melt pressure 99 bar. The line speed is 1.5 m/min.

The conductor with the melt-blended insulation and semicon is run through the CV tube, which is switched off. Measure cable surface temperatures with an infrared temperature measuring device. The surface temperature when exiting the die is 176° C.; in the transition piece of the CV tube the cable surface temperature is 83° C.; upon leaving the cooling section of the tube the surface temperature is 51° C. The ambient temperature in the extruder hall is 25° C.

A reference cable for comparison is manufactured on the same line as the inventive cable using HFDK-4201 EC XLPE (cross-linked polyethylene; available from The Dow Chemical Company) insulation and HFDK-0587 BK (ethylene copolymer; available from The Dow Chemical Company) inner semiconductive layer.

Employ the following conditions for the reference cable extrusion:
Insulation extruder temperature: 125/125/123/123/123° C.
Inner semiconductive layer extruder: 125/125/123/123/123° C.
Head temperatures: 125/125/125° C.
CV tube temperatures were set at: 360/360/360/270° C.

Operate the insulation extruder with a screw speed of 35 rpm; the melt temperature is 135° C. Operate the semiconductive layer extruder with a screw speed of 10 rpm; the melt temperature is 138° C. Line speed is 1.5 m/min.

Example 4

Influence of Cooling Rate on Morphology

Figure 1B:
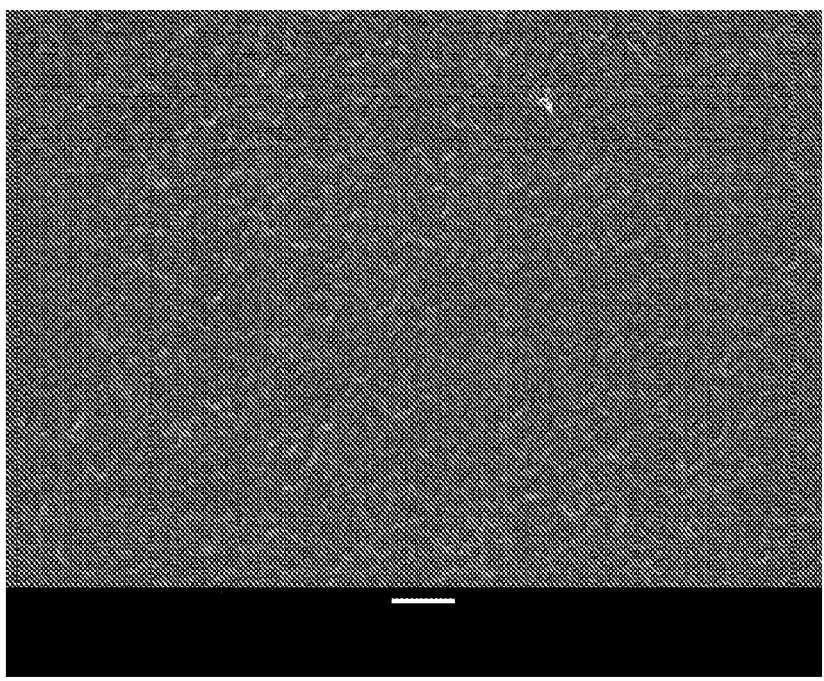

FIGS. 1a and 1b show SEM micrographs of etched transverse cable sections cut from the inventive cable prepared as described in Example 3.

Figure 2A:
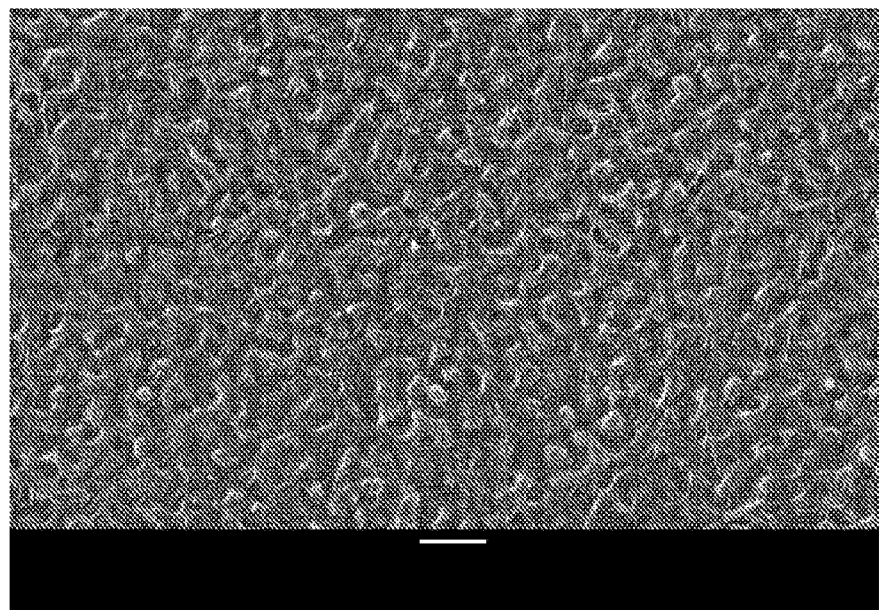
FIGS. 2a-d are SEM micrographs of samples as prepared in Example 4, cooled at average rates of 0.3, 1, 3, and 10° C./min, respectively, from 140 to 30° C., following 2 minute holds at 200° C. and natural cooling to 140° C.
Figure 2B:
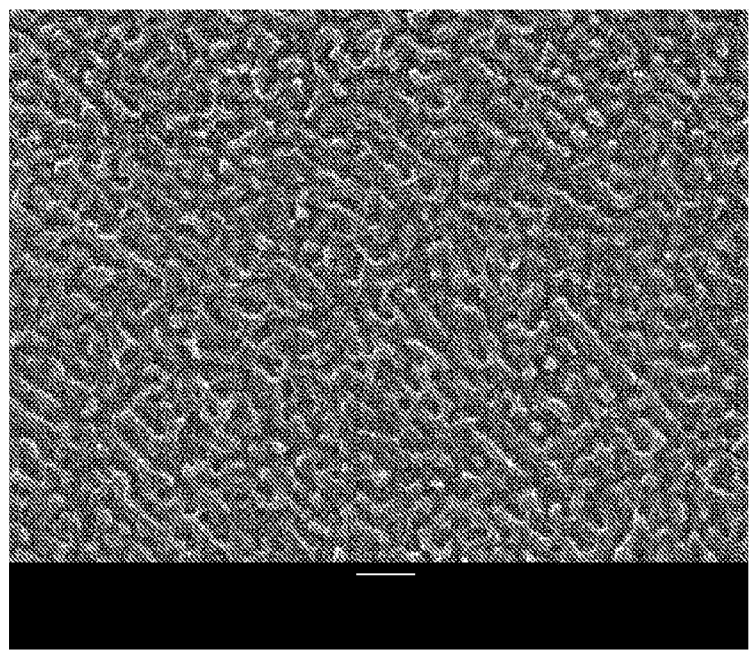
Figure 2C:
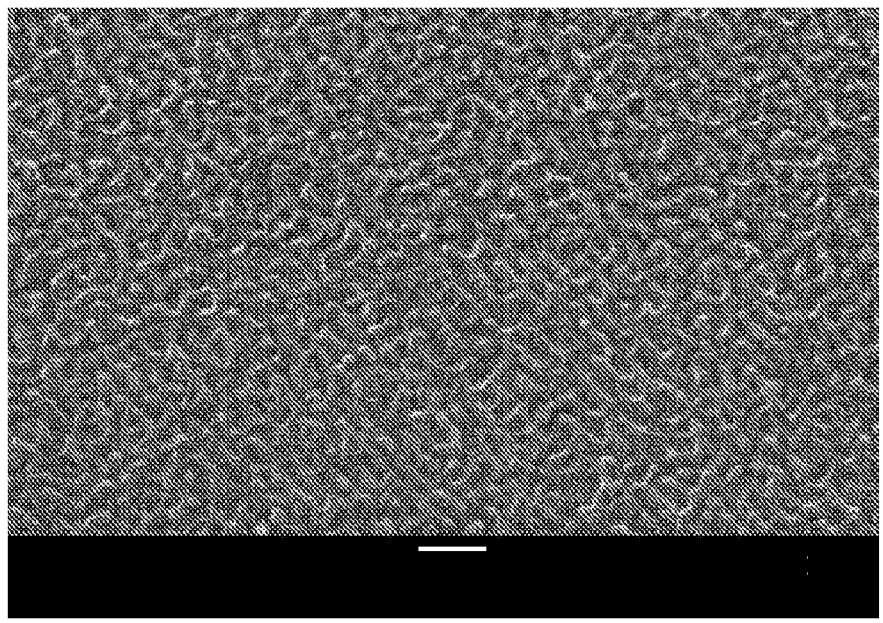
Figure 2D:
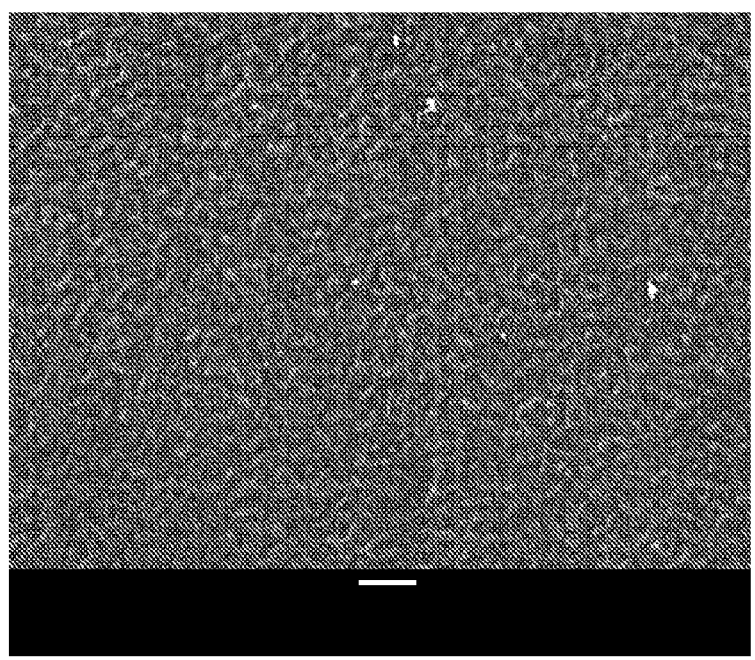

FIGS. 2a through 2d show the effect of varying the cooling rate on the morphological evolution of a series of four laboratory samples. Prepare laboratory samples according to the procedure outlined in Example 1. Control cool the samples cooled at constant rates of 0.3, 1, 3, and 10° C./min, respectively, from 140 to 30° C., following 2 minute pre-holds at 200° C. Cooling from 200 to 140° C. is performed naturally (i.e., allowed to cool in an uncontrolled manner). As seen by comparing FIGS. 2a and 2b, in the control-cooling range of 0.3 to 1° C./min, observable lamellae is less apparent. As shown in FIGS. 2c and 2d, in the control-cooling range from 1 to 10° C./min, there follows a progressive decrease in the characteristic wavelength of the morphology.

Comparison of FIGS. 1 and 2 suggests that the cable specimen crystallized around 10° C./min, assuming that shear effects during extrusion have a negligible effect on the morphology that forms.

Example 5

DC Breakdown Testing of Cables

Perform room temperature direct current ("DC") breakdown testing with a Henry Patterson & Sons Ltd. 600 kV test set. For each test, 5 samples of the test cable (as produced in Example 3) measuring 6 m (±2%) are cut, crimped, and hung from a 3 m fiber-glass rod attached to a winch. Connect the conductor to an HVDC supply using a 2 m copper pipe; a trough of tap water forms the ground electrode; the length of cable under water is 1.3 m±10%. The laboratory temperature throughout the tests remains constant at 16 to 17° C. Apply ramps in a stepwise fashion: 1.75 kV s$^{-1}$±13% rises followed by 30 s dwells, leading to an overall ramp rate of 370 V s$^{-1}$±7%. For safety reasons, it is not possible to apply a voltage greater than 400 kV to the cables. As shown in Table 3, below, none of the inventive set of samples fails.

As a comparative example, the DC breakdown performance of 5 loops of the reference cable prepared in Example 3 measuring 6 m (±2%) is also given in Table 3 below.

TABLE 3

Cable DC Breakdown Performance

| Insulation Material | Temperature (° C.) | Cable sample breakdown voltage (kV) | | | | | Weibull Characteristic Breakdown Voltage (kV) | Weibull Shape Parameter |
|---|---|---|---|---|---|---|---|---|
| | | 1 | 2 | 3 | 4 | 5 | | |
| XLPE (reference) | 15 ± 5 | 164 | 177 | 190 | 190 | 217 | 196 | 11 |
| Inventive thermoplastic insulation | 16-17 | >400 | >400 | >400 | >400 | >400 | N/A | N/A |

Example 6

DC Breakdown Testing of Deformed Cables

Deform cable samples as prepared in Example 5 by wrapping around a 60 mm±10% radius mandrel for 2 h before being allowed to relax for >12 h before testing. The objective of applying such a severe bend is to check the integrity of the semicon-dielectric interface, with the added possibility of inducing damage in the crystalline structure of the PP blend. The 2 h application time is chosen in order for the molecular relaxation processes to be essentially completed by the time of removal. Room temperature DC breakdown testing is performed according to the procedure outlined above in Example 5. Bent breakdown voltage ("Vb") data from this set of samples is presented in Table 4, below.

TABLE 4

Bent Cable DC Breakdown Performance

| Bent mini-cable | 1 | 2 | 3 | 4 | 5 |
|---|---|---|---|---|---|
| $V_b$/kV | >400 | 396 | 388 | 270 | >400 |

The breakdown results from both undeformed (Example 5) and deformed (Example 6) specimens are considerably higher than the equivalent results from reference cables, which show a Weibull characteristic breakdown voltage of 196 kV (Table 3).

The invention claimed is:

1. A process for preparing a thermoplastic polymeric composition, said process comprising:
   (a) heating a polymer blend comprising a polypropylene homopolymer and a propylene-α-olefin interpolymer to a melt temperature of (1) greater than 140° C., (2) at least the melting temperature of the polypropylene homopolymer, or (3) at least the melting temperature of the propylene-α-olefin interpolymer, whichever of (1) through (3) is greatest, for a time sufficient to form a polymer melt blend; and
   (b) cooling said polymer melt blend from said melt temperature down to ambient temperature, wherein said cooling comprises:
      (i) non-control-cooling said polymer melt blend from said melt temperature to an initial cooled temperature in the range of from 140 to 125° C.,
      (ii) control-cooling said polymer melt blend at an average cooling rate in the range of from 0.1 to 30° C. per minute from said initial cooled temperature to an intermediate cooled temperature in the range of from 110 to 100° C., and
      (iii) cooling, by either control-cooling or non-control-cooling, said polymer melt blend from said intermediate cooled temperature to ambient temperature, thereby forming said polymeric composition.

2. The process of claim 1, wherein said polymeric composition has an alternating current ("AC") breakdown strength that is at least 5% greater than an otherwise identical but quench-cooled polymeric composition, as measured on 100 micrometer thick films in accordance with ASTM D-149.

3. The process of claim 1, wherein said polymeric composition has an AC breakdown strength of at least 100 kV/mm, as measured on 100 micrometer thick films in accordance with ASTM D-149.

4. The process of claim 1, wherein said polypropylene homopolymer and said polypropylene-α-olefin interpolymer are present in said polymer blend in a weight ratio ranging from 4:1 to 1:4.

5. The process of claim 1, wherein said initial cooled temperature is 125° C., wherein said intermediate cooled temperature is 110° C., wherein said cooling of step (iii) is non-control-cooling.

6. The process of claim 1, wherein said control-cooling of step (ii) is performed at a rate in the range of from 1 to 10° C. per minute.

7. The process of claim 1, further comprising, prior to said cooling of step (b), coating said polymer melt blend on a conductive core thereby forming said polymeric coating on said conductive core following said cooling of step (b).

8. The process of claim 7, wherein said polymeric coating on said conductive core presents a direct current ("DC") breakdown strength of at least 400 kV when measured at a thickness of 3.5 mm.

9. The process of claim 1, wherein said polypropylene homopolymer is non-nucleated.

10. The process of claim 1, wherein the α-olefin component of said polypropylene-α-olefin interpolymer is ethylene.

* * * * *